US012698379B2

(12) United States Patent
Fleury et al.

(10) Patent No.: US 12,698,379 B2
(45) Date of Patent: Aug. 4, 2026

(54) METHOD FOR PRODUCING A RUBBER COMPOSITION COMPRISING A RUBBER CRUMB

(71) Applicant: COMPAGNIE GENERALE DES ETABLISSEMENTS MICHELIN, Clermont-Ferrand (FR)

(72) Inventors: Etienne Fleury, Clermont-Ferrand (FR); Mathilde Lacoste, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 1039 days.

(21) Appl. No.: 17/785,963

(22) PCT Filed: Dec. 10, 2020

(86) PCT No.: PCT/FR2020/052372
§ 371 (c)(1),
(2) Date: Jun. 16, 2022

(87) PCT Pub. No.: WO2021/123574
PCT Pub. Date: Jun. 24, 2021

(65) Prior Publication Data
US 2023/0028202 A1 Jan. 26, 2023

(30) Foreign Application Priority Data
Dec. 18, 2019 (FR) ...................................... 1914745

(51) Int. Cl.
C08L 7/00 (2006.01)

(52) U.S. Cl.
CPC ........... C08L 7/00 (2013.01); C08L 2205/035 (2013.01)

(58) Field of Classification Search
CPC .... C08L 7/00; C08L 2205/035; Y02W 30/62; B60C 1/0016; B60C 1/00
See application file for complete search history.

(56) References Cited

U.S. PATENT DOCUMENTS

2007/0231532 A1* 10/2007 Walters .................. B32B 25/10
                                                        264/459
2019/0382564 A1 12/2019 Thomasson et al.

FOREIGN PATENT DOCUMENTS

| WO | 2010039327 A1 | 4/2010 |
| WO | 2014095267 A1 | 6/2014 |
| WO | 2018115716 A1 | 6/2018 |
| WO | WO-2018115714 A1 * | 6/2018 | .............. B60C 1/00 |

OTHER PUBLICATIONS

English translation of WO-2018115714-A1 (Year: 2018).*
International Search Report and Written Opinion mailed Feb. 24, 2021 for International Application No. PCT/FR2020/052372, 10 pages.

* cited by examiner

*Primary Examiner* — Mark Eashoo
*Assistant Examiner* — Cullen L G Davidson
(74) *Attorney, Agent, or Firm* — Dickinson Wright PLLC

(57) ABSTRACT

A process for preparing a rubber composition based on at least one diene elastomer, a reinforcing filler, a crumb rubber and a crosslinking system is provided. The process comprises at least the following steps: incorporating the reinforcing filler into the diene elastomer, all at once or in several stages, and mixing; when the temperature of the mixture reaches a temperature of greater than 100° C., adding the crumb rubber; continuing the mixing up to a maximum temperature of between 120° C. and 190° C.; cooling the mixture to a temperature of less than 100° C.; incorporating the crosslinking system and mixing up to a maximum temperature of less than 110° C.

20 Claims, No Drawings

METHOD FOR PRODUCING A RUBBER COMPOSITION COMPRISING A RUBBER CRUMB

CROSS-REFERENCE TO RELATED APPLICATIONS

This U.S. national phase patent application claims priority to and the benefit of International Patent Application No. PCT/FR2020/052372, filed on Dec. 10, 2020, which claims priority to and the benefit of French patent application no. FR1914745, filed Dec. 18, 2019, the contents of which are incorporated herein by reference in their entirety.

BACKGROUND

1. Technical Field

The invention relates to the manufacture of rubber compositions comprising crumb rubbers, in particular for use in rubber articles, such as tires.

2. Related Art

It is advantageous at the current time for manufacturers to be able to reuse products made from recycled rubber, in rubber articles. Crumb rubbers are particularly advantageous in this context since they result from the recycling by grinding of rubber articles. They are generally used as fillers in mixtures used to produce parts that are not subjected to high mechanical or dynamic stresses.

It would nevertheless be advantageous to be able to use them in more highly technical articles, by better controlling the properties of the compositions containing them.

Consequently, it is necessary to know how best to prepare the rubber compositions which comprise crumb rubbers, in order to obtain the best possible performance for these compositions.

It is known in the prior art that crumb rubbers can be used in tires. For example, document WO2018/115714 A1 describes the use of certain crumb rubbers in tire compositions. In this document, the compositions are prepared, in the usual way for tire compositions, in two mixing steps called "non-productive phase" and "productive phase". During the productive phase, all the ingredients with the exception of the crosslinking system are introduced at the same time, then mixed with an increase in temperature, and during the productive phase, the crosslinking system is added, with less of an increase in temperature.

Likewise, document WO2010/039327 A1 proposes a process for preparing compositions in which the elastomers are mixed beforehand with the crumb to form a masterbatch, then this mixture is used to prepare the rubber compositions comprising all the ingredients.

The known processes for the preparation of these compositions do not make it possible to combine a simplicity of preparation in two steps, with a minimum duration of the process, and good performance of the compositions in particular in terms of fatigue and of abrasion.

Thus, a need for such solutions exists for manufacturers in the field, in order to have both the simplest and most economical process possible and good properties of the compositions.

SUMMARY

Presently, the applicant has found a process which answers this problem. The invention therefore relates to a process for preparing a rubber composition based on at least one diene elastomer, a reinforcing filler, a crumb rubber and a crosslinking system, said process comprising at least the following steps: incorporating the reinforcing filler into the diene elastomer, all at once or in several stages, and mixing; when the temperature of the mixture reaches a temperature of greater than 100° C., adding the crumb rubber; continuing the mixing up to a maximum temperature of between 120° C. and 190° C.; cooling the mixture to a temperature of less than 100° C.; incorporating the crosslinking system and mixing up to a maximum temperature of less than 110° C.

The invention relates in the same way to a process for preparing a rubber article implementing the process of the invention.

The invention also relates to a rubber article prepared according to the process of the invention, and preferentially a tire comprising a composition prepared according to the process of the invention, preferably in all or part of its tread. In this case, the tire according to the invention will preferably be selected from tires intended to equip a two-wheeled vehicle, a passenger vehicle, or else a "heavy-duty" vehicle (that is to say, underground trains, buses, off-road vehicles, heavy road transport vehicles, such as trucks, tractors or trailers), or else aircraft, construction equipment, heavy agricultural vehicles or handling vehicles.

I—CONSTITUENTS OF THE COMPOSITION PREPARED BY THE PROCESS

The rubber compositions prepared according to the invention are based on at least one diene elastomer, a reinforcing filler, a crumb rubber and a crosslinking system.

The expression "composition based on" should be understood as meaning a composition comprising the mixture and/or the product of the in situ reaction of the various base constituents used, some of these constituents being able to react and/or being intended to react with each other, at least partially, during the various phases of manufacture of the composition or during the subsequent curing, modifying the composition as it is prepared at the start.

Moreover, for the purposes of the present patent application, the term "phr" means part by weight per hundred parts of elastomers, for the purposes of the preparation of the composition before curing. That is to say, in the case of the presence of a crumb rubber, that the term "phr" means part by weight per hundred parts of "new" elastomers, thus excluding from the base 100 the elastomers contained in the crumb rubber.

In the present description, unless expressly indicated otherwise, all the percentages (%) shown are weight percentages. Furthermore, any interval of values denoted by the expression "between a and b" represents the range of values extending from more than a to less than b (i.e. limits a and b excluded), whereas any interval of values denoted by the expression "from a to b" means the range of values extending from a up to b (i.e. including the strict limits a and b).

When reference is made to a "predominant" compound, this is understood to mean, for the purposes of the present invention, that this compound is predominant among the compounds of the same type in the composition, that is to say that it is the one which represents the greatest amount by weight among the compounds of the same type and in particular more than 50%, preferably more than 75%. Thus, for example, a predominant polymer is the polymer representing the greatest weight with respect to the total weight of the polymers in the composition. In the same way, a "predominant" filler is that representing the greatest weight among the fillers of the composition. By way of example, in a system comprising just one polymer, the latter is predominant for the purposes of the present invention and, in a system comprising two polymers, the predominant polymer represents more than half of the weight of the polymers. On the contrary, a "minor" compound is a compound which does not represent the greatest fraction by weight among the compounds of the same type.

For the purposes of the present invention, when reference is made to a "predominant" unit (or monomer) within one and the same compound (or polymer), this is understood to mean that this unit (or monomer) is predominant among the units (or monomers) forming the compound (or polymer), that is to say that it is the one which represents the greatest fraction by weight among the units (or monomers) forming the compound (or polymer).

The compounds mentioned in the description can be of fossil origin or be biobased. In the latter case, they may be partially or completely derived from biomass or be obtained from renewable starting materials derived from biomass. Polymers, plasticizers, fillers, and the like, are concerned in particular.

I-1 Elastomer

The elastomer can be selected from the group consisting of diene elastomers and mixtures thereof.

The term "diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". The term "essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin).

The term "diene elastomer which can be used in the compositions in accordance with the invention" particularly means:

(a) any homopolymer of a conjugated or non-conjugated diene monomer containing from 4 to 18 carbon atoms;

(b) any copolymer of a conjugated or non-conjugated diene containing from 4 to 18 carbon atoms and of at least one other monomer. The other monomer can be ethylene, an olefin or a conjugated or non-conjugated diene.

Conjugated dienes that are suitable include conjugated dienes containing from 4 to 12 carbon atoms, in particular 1,3-dienes, notably such as 1,3-butadiene and isoprene.

Olefins that are suitable include vinylaromatic compounds containing from 8 to 20 carbon atoms and aliphatic α-monoolefins containing from 3 to 12 carbon atoms.

Vinylaromatic compounds that are suitable include, for example, styrene, ortho-, meta- or para-methylstyrene, the "vinyltoluene" commercial mixture or para-(tert-butyl) styrene.

Aliphatic α-monoolefins that are suitable notably include acyclic aliphatic α-monoolefins containing from 3 to 18 carbon atoms.

More particularly, the diene elastomer may be:

(a') any homopolymer of a conjugated diene monomer, in particular any homopolymer obtained by polymerization of a conjugated diene monomer having from 4 to 12 carbon atoms;

(b') any copolymer obtained by copolymerization of one or more conjugated dienes with one another or with one or more vinylaromatic compounds having from 8 to 20 carbon atoms;

(c') any copolymer obtained by copolymerization of one or more conjugated or non-conjugated dienes with ethylene, an α-monoolefin or a mixture thereof, such as, for example, the elastomers obtained from ethylene, from propylene with a non-conjugated diene monomer of the abovementioned type.

The diene elastomer is preferentially selected from the group consisting of polybutadienes (BRs), polyisoprenes-which are synthetic (IRs), or natural rubber (NR)-, butadiene copolymers, isoprene copolymers, and mixtures of these elastomers. Such butadiene copolymers and isoprene copolymers are more preferentially, respectively, butadiene/styrene copolymers (SBRs) and isoprene/styrene copolymers (SIRs).

The rubber composition prepared according to the invention can contain just one diene elastomer or a mixture of several diene elastomers.

According to one preferential embodiment, the diene elastomer is a mixture of at least two diene elastomers selected from the group consisting of polybutadienes, butadiene/styrene copolymers, and natural or synthetic polyisoprenes.

The diene elastomer may be modified, that is to say either coupled and/or star-branched, or functionalized, or coupled and/or star-branched and simultaneously functionalized.

Thus, the diene elastomer may be coupled and/or star-branched, for example by means of a silicon or tin atom which connects the elastomer chains together.

The diene elastomer may be simultaneously or alternatively functionalized and comprise at least one functional group. The term "functional group" is understood to mean a group comprising at least one heteroatom selected from Si, N, S, O or P. Particularly suitable as functional groups are those comprising at least one function, such as: silanol, an alkoxysilane, a primary, secondary or tertiary amine which is cyclic or non-cyclic, a thiol or an epoxide.

I-2 Reinforcing Filler

The composition according to the invention comprises a reinforcing filler. Use may be made of any type of "reinforcing" filler known for its abilities to reinforce a rubber composition which can be used in particular in the manufacture of tires, for example an organic filler, such as carbon black, an inorganic filler, such as silica, or else a mixture of these two types of fillers.

All carbon blacks, in particular the blacks conventionally used in tires or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, applications WO97/36724-A2 and WO99/16600-A1).

Mention may be made, as examples of organic fillers other than carbon blacks, of functionalized polyvinyl organic fillers, as described in applications WO2006/069792-A1, WO2006/069793-A1, WO2008/003434-A1 and WO2008/003435-A1.

The term "reinforcing inorganic filler" should be understood here as meaning any inorganic or mineral filler, whatever its colour and its origin (natural or synthetic), also referred to as "white" filler, "clear" filler or even "non-black" filler, in contrast to carbon black, capable of reinforcing, by itself alone, without means other than an intermediate coupling agent, a rubber composition intended for the manufacture of tires. In a known manner, certain reinforcing inorganic fillers can be characterized in particular by the presence of hydroxyl groups (OH) on their surface.

Mineral fillers of the siliceous type, preferably silica ($SiO_2$), or of the aluminous type, especially alumina ($Al_2O_3$), are suitable in particular as reinforcing inorganic fillers. The silica used can be any reinforcing silica known to those skilled in the art, in particular any precipitated or fumed silica exhibiting a BET specific surface area and a CTAB specific surface area both of less than 450 $m^2/g$, preferably within a range extending from 30 to 400 $m^2/g$, in particular from 60 to 300 $m^2/g$.

Any type of precipitated silica, in particular highly dispersible precipitated silicas (referred to as "HDS" for "highly dispersible" or "highly dispersible silica"), can be used. These precipitated silicas, which are or are not highly dispersible, are well known to those skilled in the art. Mention may be made, for example, of the silicas described in applications WO03/016215-A1 and WO03/016387-A1. Use may in particular be made, among commercial HDS silicas, of the Ultrasil 5000GR and Ultrasil 7000GR silicas from Evonik or the Zeosil 1085GR, Zeosil 1115 MP, Zeosil 1165MP, Zeosil Premium 200MP and Zeosil HRS 1200 MP silicas from Solvay. Use may be made, as non-HDS silica, of the following commercial silicas: the Ultrasil VN2GR and Ultrasil VN3GR silicas from Evonik, the Zeosil 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

As other examples of inorganic fillers which can be used in the rubber compositions of the invention, mention may also be made of mineral fillers of the aluminous type, in particular alumina ($Al_2O_3$), aluminium oxides, aluminium hydroxides, aluminosilicates, titanium oxides, silicon carbides or nitrides, all of the reinforcing type as described for example in applications WO99/28376-A2, WO00/73372-A1, WO02/053634-A1, WO2004/003067-A1, WO2004/056915-A2, U.S. Pat. Nos. 6,610,261-B1 and 6,747,087-B2. Mention may in particular be made of the aluminas Baikalox A125 or CR125 (Baïkowski), APA-100RDX (Condea), Aluminoxid C (Evonik) or AKP-G015 (Sumitomo Chemicals).

The physical state in which the reinforcing inorganic filler is provided is not important, whether it is in the form of a powder, of micropearls, of granules, or else of beads or any other appropriate densified form. Of course, reinforcing inorganic filler is also understood to mean mixtures of different reinforcing inorganic fillers, in particular of silicas as described above.

Those skilled in the art will understand that, as replacement for the reinforcing inorganic filler described above, use might be made of a reinforcing filler of another nature, provided that this reinforcing filler of another nature is covered with an inorganic layer, such as silica, or else comprises functional sites, in particular hydroxyl sites, at its surface which require the use of a coupling agent in order to establish the bond between this reinforcing filler and the diene elastomer. Mention may be made, by way of example, of carbon blacks partially or completely covered with silica, or of carbon blacks modified by silica, such as, without limitation, the fillers of Ecoblack® type of the CRX2000 series or of the CRX4000 series from Cabot Corporation.

Those skilled in the art will know how to adjust the total content of reinforcing filler according to the use concerned, in particular according to the type of tires concerned, for example a tire for a motorbike, for a passenger vehicle or for a utility vehicle, such as a van or heavy-duty vehicle. Preferably, this total content of reinforcing filler is within a range extending from 10 to 200 phr, more preferentially from 30 to 180 phr, and more preferentially still from 40 to 160 phr, the optimum being, in a known way, different according to the specific applications targeted.

According to a variant of the invention, the reinforcing filler is predominantly carbon black. Optionally according to this variant, the reinforcing filler can also comprise silica or another reinforcing inorganic filler.

In the present disclosure, the BET specific surface area is determined by gas adsorption using the Brunauer-Emmett-Teller method described in "The Journal of the American Chemical Society" (vol. 60, page 309, February 1938), and more specifically according to a method derived from Standard NF ISO 5794-1, appendix E, of June 2010 [multipoint (5 point) volumetric method-gas: nitrogen-degassing under vacuum: one hour at 160° C.—relative pressure p/po range: 0.05 to 0.17].

For the inorganic fillers, such as silica, for example, the CTAB specific surface area values were determined according to Standard NF ISO 5794-1, Appendix G, of June 2010. The process is based on the adsorption of CTAB (N-hexadecyl-N,N,N-trimethylammonium bromide) on the "external" surface of the reinforcing filler.

For carbon blacks, the STSA specific surface area is determined according to Standard ASTM D6556-2016.

In order to couple the reinforcing inorganic filler to the diene elastomer, use may be made, in a well-known manner, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. The term "bifunctional" is understood to mean a compound having a first functional group capable of interacting with the inorganic filler and a second functional group capable of interacting with the diene elastomer. For example, such a bifunctional compound can comprise a first functional group comprising a silicon atom, said first functional group being capable of interacting with the hydroxyl groups of an inorganic filler, and a second functional group comprising a sulfur atom, said second functional group being capable of interacting with the diene elastomer.

Preferably, the organosilanes are selected from the group consisting of organosilane polysulfides (symmetrical or asymmetrical), such as bis(3-triethoxysilylpropyl) tetrasulfide, abbreviated to TESPT, sold under the name Si69 by Evonik, or bis(triethoxysilylpropyl) disulfide, abbreviated to TESPD, sold under the name Si75 by Evonik, polyorganosiloxanes, mercaptosilanes, blocked mercaptosilanes, such as S-(3-(triethoxysilyl)propyl) octanethioate, sold by Momentive under the name NXT Silane. More preferentially, the organosilane is an organosilane polysulfide.

Of course, use might also be made of mixtures of the coupling agents described above.

The content of coupling agent in the composition of the invention is advantageously less than or equal to 35 phr, it being understood that it is generally desirable to use as little as possible thereof. Typically, the content of coupling agent represents from 0.5% to 15% by weight, with respect to the amount of reinforcing inorganic filler. Its content is preferably within a range extending from 0.5 to 20 phr, more preferentially within a range extending from 3 to 3 phr. This content is easily adjusted by a person skilled in the art according to the content of reinforcing inorganic filler used in the composition of the invention.

I-3 Crosslinking System

In the composition of the invention, use may be made of any type of crosslinking system known to those skilled in the art for rubber compositions.

The crosslinking system is preferably a vulcanization system, that is to say based on sulfur (or on a sulfur-donating agent) and on a primary vulcanization accelerator. Additional to this base vulcanization system are various known secondary vulcanization accelerators or vulcanization activators, such as zinc oxide, stearic acid or equivalent compounds, or guanidine derivatives (in particular diphenylguanidine), incorporated during the first non-productive phase and/or during the productive phase, as are described subsequently.

The sulfur is used at a preferred content of between 0.5 and 10 phr, more preferably of between 0.5 and 5 phr, in particular between 0.5 and 3 phr.

The vulcanization system of the composition according to the invention can also comprise one or more additional accelerators, for example compounds of the family of the thiurams, zinc dithiocarbamate derivatives, sulfenamides, guanidines or thiophosphates. Use may be made in particular of any compound that is capable of acting as accelerator of the vulcanization of diene elastomers in the presence of sulfur, notably accelerators of the thiazole type and derivatives thereof, and accelerators of thiuram or zinc dithiocarbamate type. These accelerators are more preferably selected from the group consisting of 2-mercaptobenzothiazole disulfide (abbreviated to "MBTS"), N-cyclohexyl-2-benzothiazolesulfenamide (abbreviated to "CBS"), N,N-dicyclohexyl-2-benzothiazolesulfenamide (abbreviated to "DCBS"), N-(tert-butyl)-2-benzothiazolesulfenamide (abbreviated to N-(tert-butyl)-2-"TBBS"), benzothiazolesulfenimide (abbreviated to "TBSI"), zinc dibenzyldithiocarbamate (abbreviated to "ZBEC") and mixtures of these compounds. Preferably, use is made of a primary accelerator of the sulfenamide type.

I-4 Crumb Rubber

The composition of the invention also comprises a crumb rubber (abbreviated to "crumb" in the remainder of the text).

The crumbs are presented in the form of granules, optionally put into the form of a rubber plaque. Generally, crumb rubbers result from a grinding or from a micronization of cured rubber compositions already used for a first application, for example in tires; they are a product of recycling of the materials. The crumbs thus preferably consist of a composition based on at least one elastomer and a filler. The crumbs are preferably provided in the form of microparticles.

The term "microparticles" is intended to mean particles which have a size, namely their diameter in the case of spherical particles or their largest dimension in the case of anisometric particles, of a few tens of or a few hundred microns.

The crumb rubber preferentially has a mean size D50 of between 100 and 300 μm, and a particle size distribution such that the ratio of the mean sizes D10/D50 is greater than or equal to 0.5, preferably between 0.55 and 0.95 and more preferentially between 0.6 and 0.9, and even more preferentially between 0.65 and 0.85.

These specific crumbs can be obtained by various technologies, in particular by cryogenic micronization processes as described in documents U.S. Pat. Nos. 7,445,170 and 7,861,958. According to another embodiment of the invention, the crumbs can be obtained by other micronization processes known to those skilled in the art and not limited to the cryogenic process alone.

Depending on the size distribution of objects obtained, the crumb obtained by the cited processes can undergo an additional sieving step so as to control this distribution. The sieving can be carried out by various technologies (vibration, centrifugation, suction) known to those skilled in the art.

Likewise, commercially available crumbs such as the Polydine PD80 crumb from Lehigh Technologies can be used.

Preferably, the crumb is present at a content within a range extending from 5% to 40% by weight, preferably from 10% to 30% and more preferably from 15% to 25%. In a typical composition intended for the tire, these contents by weight correspond to contents of 5 to 100 phr. Preferably, the crumb content is preferably within a range extending from 10 to 90 phr, preferentially from 15 to 90 phr, more preferentially from 20 to 80 phr and very preferentially from 30 to 70 phr for optimum operation of the invention.

As discussed above, the crumbs preferably consist of a composition based on an elastomer and a filler. They may also comprise all the ingredients normally used in rubber compositions, such as plasticizers, antioxidants, vulcanization additives, etc.

Thus, the crumb comprises an elastomer, preferentially a diene elastomer. This elastomer preferentially represents at least 30% by weight, more preferentially at least 35% by weight, even more preferentially at least 45% by weight of the weight of the crumb, said percentage being determined according to Standard ASTM E1131. It is preferentially selected from the group consisting of polybutadienes, polyisoprenes including natural rubber, butadiene copolymers and isoprene copolymers. More preferentially, the molar content of units of diene origin (conjugated dienes) present in the diene elastomer is greater than 50%, preferably between 50% and 70%.

According to a preferred embodiment of the invention, the crumb contains between 5% and 80% by weight of filler, more preferably between 10% and 75% and very preferably between 15% and 70%.

The term "filler" is understood here to mean any type of filler, whether it is reinforcing (typically having nanometric particles, preferentially with a weight-average size of less than 500 nm, in particular between 20 and 200 nm) or whether it is non-reinforcing or inert (typically having micrometric particles, preferentially with a weight-average size of greater than 1 μm, for example between 2 and 200 μm). The weight-average size of the nanometric particles is measured in a manner well known to those skilled in the art (by way of example, according to application WO2009/

083160 paragraph I.1). The weight-average size of the micrometric particles can be determined by mechanical sieving.

Mention will in particular be made, as examples of fillers known as reinforcing to those skilled in the art, of carbon black or of a reinforcing inorganic filler, such as silica or alumina in the presence of a coupling agent, or mixtures thereof.

According to a preferred embodiment of the invention, the crumb comprises, by way of filler, a reinforcing filler, in particular a carbon black or a mixture of carbon blacks.

The carbon black or the mixture of carbon blacks preferentially represents more than 50%, more preferentially more than 80%, even more preferentially more than 90% by weight of the weight of the reinforcing filler of the crumb. According to a more preferred embodiment, the reinforcing filler consists of a carbon black or a mixture of carbon blacks.

Very preferably, the carbon black is present in the crumb at a content ranging from 20% to 40% by weight, more preferably from 25% to 35% by weight.

All carbon blacks, in particular blacks of the HAF, ISAF, SAF, FF, FEF, GPF and SRF type, conventionally used in rubber compositions for tires ("tire-grade" blacks) are suitable as carbon blacks.

The crumb can contain all the other usual additives which participate in a rubber composition, in particular for a tire. Among these usual additives, mention may be made of liquid or solid plasticizers, non-reinforcing fillers such as chalk, kaolin, protective agents, vulcanization agents. These additives may be in the crumb also in the form of a residue or of a derivative, since they were able to react during the steps of producing the composition or of crosslinking the composition from which the crumb is derived.

The crumbs can be simple ground/micronized rubber materials, without other treatment. It is also known that these crumbs can undergo a treatment in order to modify them. This treatment can consist of a chemical functionalization or devulcanization modification. It can also be a thermomechanical, thermochemical, biological, etc. treatment. Preferentially for the invention, use is made of a crumb which has not undergone any modification by thermal and/or mechanical and/or biological and/or chemical treatment.

As regards the constituents of the crumb, it is preferable, for the requirements of the invention, for the crumb to exhibit an acetone extract of between 3% and 30% by weight, more preferentially of between 3% and 15% by weight, more preferentially of between 3% and 10% by weight.

It is also preferable for the crumb to exhibit a chloroform extract of between 3% and 85% by weight, more preferentially of between 3% and 20% by weight, more preferentially of between 5% and 15% by weight.

Preferably, the chloroform extract of the crumb rubber exhibits a weight-average molecular weight (Mw) of less than 10 000 g/mol, preferably of less than 8000 g/mol. Preferably in this type of crumb, the ratio of the chloroform extract to the acetone extract, expressed as weight percentage, is less than 1.5.

The characteristics of the crumb rubbers, as described above, are measured as shown below.

Measurement of the Size of the Crumb Particles:

The crumb particle size weight distribution can be measured by laser particle size analysis, on a mastersizer 3000 device from Malvern. The measurement is carried out by the liquid route, diluted in alcohol after an ultrasound pretreatment for 1 min in order to guarantee the dispersion of the particles. The measurement is carried out in accordance with Standard ISO-13320-1 and makes it possible to determine in particular the D10 and the D50, that is to say the mean diameter below which respectively 10% by weight and 50% by weight of the total population of particles are present.

Measurement of the Weight Fraction of Carbon Black:

The carbon black weight fraction is measured by thermogravimetric analysis (TGA) according to Standard NF T-46-07, on an instrument from Mettler Toledo, model "TGA/DSC1". Approximately 20 g of sample are introduced into the thermal analyser, then subjected to a thermal program from 25 to 600° C. under an inert atmosphere (pyrolysable phase), then from 400 to 750° C. under an oxidizing atmosphere (oxidizable phase). The weight of the sample is measured continuously throughout the thermal program. The organic matter content corresponds to the loss of weight measured during the pyrolysable phase related back to the initial weight of sample. The black content corresponds to the loss of weight measured during the oxidizable phase related back to the initial weight of sample.

Measurement of the Acetone Extract:

The acetone extract content is measured according to Standard ISO1407 by means of an extractor of Soxhlet type.

A sample test specimen (between 500 mg and 5 g) is introduced into an extraction thimble and then placed in the extractor tube of the Soxhlet. A volume of acetone equal to two or three times the volume of the extractor tube is placed in the collector of the Soxhlet. The Soxhlet is subsequently assembled and then heated for 16 h.

The sample is weighed after extraction. The acetone extract content corresponds to the loss of weight of the sample during the extraction, related back to the initial weight thereof.

It is also possible to calculate the content of elastomer, which corresponds to the content of organic matter determined by thermogravimetric analysis from which the content of acetone extract is subtracted.

Measurement of the Chloroform Extract:

The chloroform extract content is measured according to Standard ISO1407 by means of an extractor of Soxhlet type.

A sample test specimen (between 500 mg and 5 g) is introduced into an extraction thimble and then placed in the extractor tube of the Soxhlet. A volume of chloroform equal to two or three times the volume of the extractor tube is placed in the collector of the Soxhlet. The Soxhlet is subsequently assembled and then heated for 16 h.

The sample is weighed after extraction. The chloroform extract content corresponds to the loss of weight of the sample during the extraction, related back to the initial weight thereof.

Measurement of the Average Molecular Weights of the Chloroform Extract:

The molecular weights are determined by size exclusion chromatography, according to a Moore calibration and according to Standard ISO16014.

The measurement of the weight-average molecular weight (Mw) of the chloroform extract is carried out by size exclusion chromatography (SEC) with a refractive index (RI) detector. The system is composed of an Alliance 2695 system from Waters, of a column oven from Waters and also of an RI 410 detector from Waters. The set of columns used is composed of two PL GEL MIXED D columns (300×7.5 mm 5 μm) followed by two PL GEL MIXED E columns (300×7.5 mm 3 μm) from Agilent. These columns are placed in a column oven thermostatically controlled at 35° C. The mobile phase used is non-antioxidized tetrahydrofuran. The flow rate of the mobile phase is 1 ml/min. The RI detector is also thermostatically controlled at 35° C.

The chloroform extract is dried under a nitrogen stream. The dry extract is subsequently taken up at 1 g/l in non-antioxidized tetrahydrofuran at 250 ppm with stirring for 2 hours. The solution obtained is filtered using a syringe and a single-use 0.45 μm PTFE syringe filter. 100 μl of the filtered solution are injected into the conditioned chromatographic system at 1 ml/min and 35° C.

The Mw results are provided by integration of the chromatographic peaks detected by the RI detector above a value of 2000 g/mol. The Mw is calculated from a calibration carried out using polystyrene standards.

I-5 Other Possible Additives

The rubber compositions in accordance with the invention optionally also comprise all or a portion of the normal additives generally used in elastomer compositions intended in particular for the manufacture of treads, such as, for example, pigments, protective agents, such as antiozone waxes, chemical antiozonants or antioxidants, plasticizing agents (such as oils or plasticizing resins), anti-fatigue agents, reinforcing resins, methylene acceptors (for example novolac phenolic resin) or methylene donors (for example HMT or H3M).

Needless to say, the compositions prepared according to the invention may be used alone or as a blend (i.e., as a mixture) with any other rubber composition which can be used for the manufacture of rubber articles and, according to one preferential embodiment, of tires.

It goes without saying that the invention relates to the rubber compositions described previously both in the "uncured" or non-crosslinked state (i.e., before curing) and in the "cured" or crosslinked, or also vulcanized, state (i.e., after crosslinking or vulcanization).

II—PROCESS FOR PREPARING THE RUBBER COMPOSITIONS

The process of the invention uses, in a manner known to those skilled in the art, two successive preparation phases in suitable mixers; a first phase of thermomechanical working or kneading (sometimes referred to as "non-productive" phase) at high temperature, followed by a second phase of mechanical working (sometimes referred to as "productive" phase) at lower temperature, during which finishing phase the crosslinking system is incorporated; such phases have been described for example in applications EP-A-0501227, EP-A-0735088, EP-A-0810258, WO00/05300 or WO00/05301.

The invention relates to a process for preparing a rubber composition based on at least one diene elastomer, a reinforcing filler, a crumb rubber and a crosslinking system, said process comprising at least the following steps: incorporating the reinforcing filler into the diene elastomer, all at once or in several stages, and mixing (step A); when the temperature of the mixture reaches a temperature of greater than 100° C., adding the crumb rubber (step B); continuing the mixing up to a maximum temperature of between 120° C. and 190° C. (step C); cooling the mixture to a temperature of less than 100° C. (step D); incorporating the crosslinking system and mixing up to a maximum temperature of less than 110° C. (step E).

It is understood that, in the process of the invention, steps A to D correspond to the non-productive phase, while step E corresponds to the productive phase.

If the composition prepared comprises other, optional ingredients, in addition to the diene elastomer, the reinforcing filler, the crumb rubber and the crosslinking system, these ingredients are preferably introduced during step A. Preferably, they are incorporated simultaneously with the diene elastomer. Also preferably, they are incorporated simultaneously with the reinforcing filler.

One of the advantages of the invention is that it comprises the two usual preparation steps, without requiring the prior manufacture of a masterbatch, allowing an optimum manufacturing time and simple equipment.

Preferentially, during step A, the reinforcing filler is incorporated when the diene elastomer reaches a temperature of greater than 50° C., preferably greater than 80° C.

Preferentially, during step B, the crumb rubber is added when the mixture reaches a temperature of greater than 110° C., preferably greater than 120° C.

Preferentially, during step C, the mixing is continued up to a maximum temperature of between 130° C. and 180° C., preferably between 140° C. and 170° C.

Preferentially, during step D, the mixture is cooled to a temperature of less than 80° C., preferably less than 60° C.

Preferentially, steps A to C are carried out in a first mixer, preferably an internal mixer.

Preferentially, steps A to C are carried out for a period of time within a range extending from 1 to 7 minutes, preferably from 2 to 5 minutes.

Preferentially, step E is carried out in a second mixer, preferably an external mixer.

Preferentially, step E is carried out for a period of time within a range extending from 5 to 15 minutes, preferably from 8 to 12 minutes.

The final composition thus obtained can subsequently be calendered, for example in the form of a sheet or slab, in particular for laboratory characterization, or else extruded, in order to form, for example, a rubber profiled element used in the manufacture of semi-finished products for tires. These products can subsequently be used for the manufacture of rubber articles, such as tires, according to techniques known to those skilled in the art.

The crosslinking (or curing) can be performed in a known manner at a temperature generally of between 130° C. and 200° C., under pressure, for a sufficient time which may range, for example, between 5 and 90 min, as a function notably of the curing temperature, of the crosslinking system adopted, of the kinetics of crosslinking of the composition under consideration or else of the size of the article manufactured.

The examples that follow illustrate the invention without, however, limiting it.

III—EXAMPLES OF IMPLEMENTATION OF THE INVENTION

III-1 Characterization of the Rubber Compositions

In the examples, the rubber compositions are characterized after curing as indicated below.

Fatigue:

The fatigue strength, expressed as number of cycles or in relative units (r.u.), is measured in a known manner on 12 test specimens subjected to repeated low-frequency tensile deformations up to an elongation of 75%, at 23° C., using a Monsanto (MFTR) machine until the test specimen breaks, according to Standards ASTM D4482-85 and ISO40 6943.

The result is expressed in base 100 for facilitated comparison of the results. A value greater than that of the control, arbitrarily set at 100, indicates an improved result, that is to say a better fatigue strength of the rubber samples.

Abrasion:

The abrasion measurement can be carried out on an LAT100 abrasion tester, a device known to a person skilled in the art, the result of which is a loss in weight per kilometre. The cylindrical test specimen conforms to usual practice. It is applied with a fixed load of for example 75 N against a circular track. This cylindrical test specimen is subject to a drift of 5.5 degrees. The rotation speed of the abrasive disc is 12 km/h.

The result is expressed in base 100 for facilitated comparison of the results. A value greater than that of the control, arbitrarily set at 100, indicates an improved result, that is to say a better abrasion resistance of the rubber samples.

III-2 Rubber Compositions

According to the process P1, similar to that described in document WO2018/115714 A1, the compositions are manufactured, in the usual way for tire compositions, in two mixing steps referred to as "non-productive phase" and "productive phase". During the non-productive phase, the elastomers, the reinforcing filler, the crumb and the other ingredients with the exception of the crosslinking system are introduced into an internal mixer, at a temperature of 50° C. Mixing is continued up to a temperature of 160° C. The total duration of the non-productive phase is approximately 3 minutes and 30 seconds. After cooling of the mixture thus obtained, the crosslinking system is incorporated at 30° C. into an external mixer (roller mixer), during the productive phase; the entire mixture is then mixed for 10 minutes.

According to the process P2, similar to that described in document WO2010/039327 A1, the compositions are manufactured in three mixing steps, with two "non-productive" phases and one "productive" phase. During the first non-productive phase, the elastomers and crumb are introduced, at 50° C., into an internal mixer (laboratory mixer, volume of 3300 cm³). Mixing is continued for approximately 2 minutes until the temperature reaches 110° C. A masterbatch is thus obtained. After cooling, a second non-productive phase is carried out, during which the masterbatch obtained in the first non-productive phase, the reinforcing filler and the other ingredients with the exception of the crosslinking system are introduced into an internal mixer, at a temperature of 50° C. Mixing is continued up to a temperature of 160° C. The total duration of the two non-productive phases is approximately 5 minutes and 30 seconds. After cooling of the mixture thus obtained, the crosslinking system is incorporated at 30° C. into an external mixer (roller mixer), during the productive phase; the entire mixture is then mixed for 10 minutes.

According to the process P3, representative of the process of the invention, the compositions are manufactured, in the usual way for tire compositions, in two mixing steps referred to as "non-productive phase" and "productive phase". During the non-productive phase, the elastomers are introduced into an internal mixer and mixed up to a temperature of 50° C. At the temperature of 90° C., the reinforcing filler and the other ingredients with the exception of the crumb and the crosslinking system are introduced. Then, at the temperature of 140° C., the crumb is added. Mixing is continued up to a temperature of 160° C. The total duration of the non-productive phase is approximately 3 minutes and 30 seconds. After cooling of the mixture thus obtained, the crosslinking system is incorporated at 30° C. into an external mixer (roller mixer), during the productive phase; the entire mixture is then mixed for 10 minutes.

Compositions C1 and C2, presented in Table 1, were prepared according to the three different processes P1, P2 and P3, described above. The performances of these processes and compositions prepared are shown in Table 2.

It is noted in Table 2 that compositions C1 and C2, when they are prepared by the process P3, in accordance with the invention, have the best balance between their performance in terms of abrasion and of fatigue, while allowing an optimal duration of the process and therefore a very good productivity.

TABLE 1

| Composition | C1 | C2 |
|---|---|---|
| NR (1) | 60 | 60 |
| BR (2) | 20 | 20 |
| SBR1 (3) | 20 | — |
| SBR2 (4) | — | 20 |
| Carbon black 1 (5) | 57 | — |
| Carbon black 2 (6) | — | 54 |
| Crumb (7) | 41 | 41 |
| Antioxidant (8) | 1.5 | 1.5 |
| Stearic acid (9) | 2.5 | 2.5 |
| Zinc oxide (10) | 2.5 | 2.5 |
| Accelerator (11) | 1 | 1 |
| Sulfur | 1.5 | 1.5 |

(1) NR: Natural rubber
(2) BR: polybutadiene, CB24 from Lanxess; 96% of 1,4-cis; Tg = −107° C.
(3) SBR with 22.5% by weight of styrene units and, for the butadiene part, 15% of 1,2 units and 15% of 1,4-cis units (Tg = −52° C.)
(4) SBR with 15.5% by weight of styrene units and, for the butadiene part, 24% of 1,2 units and 28% of 1,4-cis units (Tg = −65° C.)
(5) Carbon black, ASTM N375 grade
(6) Carbon black, ASTM N234 grade
(7) Polydine PD 80 crumb from Lehigh Technologies
(8) N-(1,3-Dimethylbutyl)-N'-phenyl-p-phenylenediamine (Santoflex 6-PPD) from Flexsys
(9) "Pristerene 4931" stearin from Uniqema
(10) Zinc oxide, industrial grade - Umicore
(11) N-Cyclohexyl-2-benzothiazolesulfenamide (Santocure CBS from Flexsys)

(1) NR: Natural rubber
(2) BR: polybutadiene, CB24 from Lanxess; 96% of 1,4-cis; Tg=−107° C.
(3) SBR with 22.5% by weight of styrene units and, for the butadiene part, 15% of 1,2 units and 15% of 1,4-cis units (Tg=−52° C.)
(4) SBR with 15.5% by weight of styrene units and, for the butadiene part, 24% of 1,2 units and 28% of 1,4-cis units (Tg=−65° C.)
(5) Carbon black, ASTM N375 grade
(6) Carbon black, ASTM N234 grade
(7) Polydine PD 80 crumb from Lehigh Technologies
(8) N-(1,3-Dimethylbutyl)-N'-phenyl-p-phenylenedi-amine (Santoflex 6-PPD) from Flexsys
(9) "Pristerene 4931" stearin from Uniqema
(10) Zinc oxide, industrial grade-Umicore
(11) N-Cyclohexyl-2-benzothiazolesulfenamide (Santocure CBS from Flexsys)

TABLE 2

| | Composition | | | | | |
|---|---|---|---|---|---|---|
| | C1 | | | C2 | | |
| | Mixing | | | | | |
| | P1 | P2 | P3 | P1 | P2 | P3 |
| Non-productive phase duration (min) | 3.5 | 7.5 | 3.5 | 3.5 | 7.5 | 3.5 |
| Fatigue Performance (base 100) | 100 | 136 | 118 | 100 | 300 | 200 |
| Abrasion Performance (base 100) | 100 | 124 | 119 | 100 | 140 | 125 |

15

16

The invention claimed is:

1. A process for preparing a rubber composition based on at least one diene elastomer, a reinforcing filler, a crumb rubber and a crosslinking system, said process comprising at least the following steps A to E:

step A: Incorporating the reinforcing filler into the diene elastomer, all at once or in several stages, and mixing to form a first mixture, step B: when the temperature of the first mixture reaches a temperature of greater than 100° C., adding the crumb rubber to form a second mixture, step C: continuing the mixing of the second mixture up to a maximum temperature of between 120° C. and 190° C. to form a third mixture, step D: cooling the third mixture to a temperature of less than 100° C. to form a fourth mixture, step E: incorporating into the fourth mixture the cross-linking system and mixing up to a maximum temperature of less than 110° C. to form a fifth mixture.

2. The process according to claim 1, in which, during step A, the reinforcing filler is incorporated when the diene elastomer reaches a temperature of greater than 50° C.

3. The process according to claim 1, in which, during step B, the crumb rubber is added when the first mixture reaches a temperature of greater than 110° C.

4. The process according to claim 1, in which, during step C, the mixing is continued up to a maximum temperature of between 130° C. and 180° C.

5. The process according to claim 1, in which, during step D, the third mixture is cooled to a temperature of less than 80° C.

6. The process according to claim 1, in which steps A to C are carried out in a first mixer.

7. The process according to claim 1, in which steps A to C are carried out for a period of time within a range extending from 1 to 7 minutes.

8. The process according to claim 1, in which step E is carried out in a second mixer.

9. The process according to claim 1, in which step E is carried out for a period of time within a range extending from 5 to 15 minutes.

10. The process according to claim 1, in which the crumb rubber has an acetone extract of between 3% and 30% by weight.

11. The process according to claim 1, in which the crumb rubber has a chloroform extract of between 3% and 85% by weight.

12. The process according to claim 1, in which the crumb rubber has a ratio of the chloroform extract to the acetone extract, expressed as weight percentage, of less than 1.5.

13. The process according to claim 1, in which the diene elastomer is selected from the group consisting of polyb-utadienes, polyisoprenes, butadiene copolymers, isoprene copolymers and the mixtures of these elastomers.

14. The process according to claim 1, in which the diene elastomer is a mixture of at least two diene elastomers selected from the group consisting of polybutadienes, buta-diene/styrene copolymers, and natural or synthetic polyiso-prenes.

15. The process according to claim 2, in which, during step A, the reinforcing filler is incorporated when the diene elastomer reaches a temperature of greater than 80° C.

16. The process according to claim 3, in which, during step B, the crumb rubber is added when the first mixture reaches a temperature of greater than 120° C.

17. The process according to claim 4, in which, during step C, the mixing is continued up to a maximum tempera-ture of between 140° C. and 170° C.

18. The process according to claim 5, in which, during step D, the third mixture is cooled to a temperature of less than 60° C.

19. The process according to claim 6, in which steps A to C are carried out in an internal mixer.

20. The process according to claim 3, in which, during step B, the crumb rubber is added when the first mixture reaches a temperature of greater than 140° C.

* * * * *